United States Patent
Schmidbauer et al.

(10) Patent No.: US 6,751,989 B1
(45) Date of Patent: Jun. 22, 2004

(54) DEVICE AND METHOD FOR MELTING OR REFINING GLASS OR GLASS CERAMICS

(75) Inventors: Wolfgang Schmidbauer, Mainz (DE); Hildegard Römer, Karben (DE); Guido Räke, Bingen (DE)

(73) Assignee: Schott Glas, Mainz (DE)

( * ) Notice: Subject to any disclaimer, the term of this patent is extended or adjusted under 35 U.S.C. 154(b) by 149 days.

(21) Appl. No.: 09/807,945

(22) PCT Filed: Aug. 8, 2000

(86) PCT No.: PCT/EP00/07650

§ 371 (c)(1),
(2), (4) Date: Jul. 12, 2001

(87) PCT Pub. No.: WO01/14262

PCT Pub. Date: Mar. 1, 2001

(30) Foreign Application Priority Data

Aug. 21, 1999 (DE) ............................... 199 39 782

(51) Int. Cl.$^7$ ........................... C03B 5/02; C03B 5/435
(52) U.S. Cl. ...................... 65/347; 65/346; 65/355; 65/356; 65/135.6; 373/30; 373/39; 373/144; 373/161
(58) Field of Search ...................... 65/356, 355, 347, 65/346, 135.6, 136.4, 137, 135.1, DIG. 4; 373/39, 29–30, 27, 138–144, 150, 152–154, 159–165; 266/106, 107, 212, 234

(56) References Cited

U.S. PATENT DOCUMENTS

| | | | |
|---|---|---|---|
| 2,252,756 A | | 8/1941 | Byers ............................. 49/54 |
| 2,908,739 A | | 10/1959 | Rummel ......................... 13/27 |
| 3,127,155 A | * | 3/1964 | Geffcken |
| 3,632,335 A | * | 1/1972 | Worner ......................... 75/587 |
| 3,875,322 A | * | 4/1975 | Sundberg ..................... 373/152 |
| 3,888,650 A | * | 6/1975 | Gell et al. ..................... 65/125 |
| 4,049,384 A | * | 9/1977 | Wenckus et al. |
| 4,441,191 A | * | 4/1984 | Fredrikson et al. ......... 373/161 |
| 4,589,637 A | * | 5/1986 | Bamji et al. ................. 266/234 |
| 4,687,646 A | | 8/1987 | Mateika et al. ............. 422/248 |
| 4,792,536 A | * | 12/1988 | Pecoraro et al. |
| 5,383,949 A | * | 1/1995 | Bubon et al. .................. 65/356 |
| 5,509,951 A | * | 4/1996 | Baucke et al. ............. 65/134.6 |
| 5,609,661 A | * | 3/1997 | Moreau et al. ............. 65/135.1 |
| 6,014,403 A | * | 1/2000 | Braglia et al. |
| 6,058,741 A | | 5/2000 | Sobolev et al. ............... 65/335 |

FOREIGN PATENT DOCUMENTS

| | | |
|---|---|---|
| DE | 33 16546 | 4/1984 |
| FR | 2613351 | 10/1988 |
| FR | 2768257 | 3/1999 |
| GB | 225211 | 3/1925 |
| JP | 57-095834 | 6/1982 |

OTHER PUBLICATIONS

Patent Abstract of Japan, JP57 095834A, Jun. 14, 1982.

* cited by examiner

*Primary Examiner*—Steven P. Griffin
*Assistant Examiner*—Eric Hug
(74) *Attorney, Agent, or Firm*—Ohlandt, Greeley, Ruggiero & Perle, L.L.P.

(57) ABSTRACT

The invention relates to a device for melting or refining glass or glass ceramics. According to the invention, a device of this type is provided with the following characteristics: a plurality of tubes which are U-shaped and arrange side by side so that they form a cage like skull channel that is open on top, and a high frequency oscillation circuit which comprises an induction coil. The tubes can be connected to a cooling medium. The induction coil wraps around the channel in such a manner that winding sections extend along the lateral walls of the channel.

8 Claims, 4 Drawing Sheets

DEVICE AND METHOD FOR MELTING OR REFINING GLASS OR GLASS CERAMICS

FIELD OF THE INVENTION

The invention concerns a device for the melting or refining of glasses or glass ceramics.

BACKGROUND OF THE INVENTION

Such devices have become known in the configuration of the so-called "skull pot". They comprise a pot walling. This is generally cylindrical. It is constructed of a crown of vertical metal pipes. Slots remain between adjacent pipes. The bottom of the pot can also be constructed of metal pipes. However, it can also consist of refractory material. The ends are connected to vertical pipes for the introduction of cooling agent or for the discharge of cooling agent.

Heating is conducted by means of an induction coil, which surrounds the pot walling and by means of which high-frequency energy can be input into the contents of the pot.

Such a skull pot has been made known, for example, from EP 0 528,025 B1.

A skull pot operates as follows: The pot is filled with a [fresh] glass batch or refuse glass or a mixture thereof. The glass or the melt must first be preheated in order to obtain a certain minimum conductivity. Preheating is primarily conducted by means of burner heating. If the temperature for [HF energy] input has been reached, then further energy input can be supplied by means of irradiation by high-frequency energy. During the operation, in addition to the high-frequency energy heating, the melt is also heated by means of burners, which operate from the top onto the melt, or by means of hot off-gases. This additional heating is particularly necessary in the case of the use of a skull pot for refining. That is, if the surface layer is cold and correspondingly highly viscous, then bubbles will be prevented from exiting the melt or a foaming will occur.

Usually, the skull pot is arranged in a standing position. It is generally operated discontinuously.

JP 57 [1982]-95,834 describes a device with a quartz channel, which is arranged horizontally.

A high-frequency oscillating circuit, which contains a cylindrical coil, is assigned a to the quartz channel. The cylindrical coil wraps around the quartz channel. The quartz channel is actually cooled, However, when aggressive glasses are melted, it does not have a high long-term stability and a high breaking strength. In addition, a special heating of the melt surface is not possible. In fact, a certain cooling occurs, which can lead to the formation of a tough skin in the surface region. If such a channel is to be used as a refining device, then bubbles can no longer rise up unhindered and be discharged from the melt. The channel therefore cannot be used for refining. If the channel is used for melting, and the melt contains readily volatile components, then there is a risk of condensation at the cooled superstructure of the channel. The condensate can thus drip into the melt in an uncontrolled manner. This can lead to glass defects in the form of nodes, blisters or streaks. If corrosion of the coil material occurs, then this leads to discoloration of the glass, depending on the material of the coil. This is not acceptable, particularly in the case of optical glasses.

Further, there are very many optical glasses, which have a high proportion of fluorine, phosphate or other highly aggressive components. These can also attack the material of the coil. The corrosion can be strong enough that discharge of cooling water occurs, so that the operational safety of the plant is no longer assured.

SUMMARY OF THE INVENTION

The object of the invention is to create a device, in which the advantages of the technique of inductive heating are utilized, which is reliable in operation, which is also suitable for the refining of melts, and which leads to glasses of a perfect quality. This object is resolved by the features of claim 1.

According to the invention, not only is use made of the high-frequency technique, but also the skull technique is used. A channel is used, which has a structure similar to that of a skull pot. The upper space is not covered by water-cooled pipes in this way. Rather, it is freely accessible and can be used for thermal insulation or for an additional heating by means of a burner or by means of radiant heat.

The invention, however, introduces the following additional advantage, which the inventors have recognized:

If the water-cooled metal pipes of a skull device run in the direction of the glass flux, then flashovers between the glass melt and the metal pipes of the skull channel can occur at high melt temperatures, if the solidified cold glass insulation layer is very thin. This can lead to arcing between the skull channel and the melt, which can have as a consequence a disruption of the skull frame. It is presumed that the arc formation is produced by high-frequency voltages induced in the skull pipe.

In one embodiment according to the invention, the water-cooled metal skull pipes run perpendicular to the direction of glass flow, thus not in the direction of glass flow. In this way, the formation of arcs between the skull pipes and the melt is extensively avoided.

In another embodiment of the invention, the tendency toward flashover, i.e.: the tendency to form arcs, is fully prevented in that the ends of the U-shaped piece of the skull pipe are joined with each other in a conductive manner for purposes of forming a short-circuit bridge [shunt].

The invention introduces the following additional advantages:

It is excellently suitable for continuous operation. It can thus operate very economically.

Another advantage consists of the following:

Due to the configuration and arrangement of the induction coils in the lying-down position, the channel is open at the top. The level of the melt is exposed. The surface of the melt is thus freely accessible for the installation of an additional heating device, for example, a gas burner or an electrical heating device. This top heating is of particular advantage for the case when the channel is utilized as a refining aggregate. High surface temperatures can be obtained accordingly, so that the bursting of bubbles is assured in the region of the surface.

The heating from above is also helpful if high-frequency energy failure occurs. In this way, at least the glass transport can be assured. Also, the melt temperature can be maintained at such a value that a recoupling is possible when high-frequency heating is again started up.

Further, there is no danger of condensation of products of evaporation on the water-cooled coil pipes, since these are not found above the level of the melt.

Additionally, a complex superstructure is provided in the case of the skull channel according to the invention, which includes ceramic plates that cover the channel. The ceramic plates can be heated on the top side by means of burners. The plates then radiate heat onto the glass surface by their lower side, so that the glass is indirectly heated. This has the advantage that strong and turbulent atmospheric interferences do not occur directly below* the level of the glass melt in the case of glasses containing components that have a high tendency toward evaporation ($B_2O_3$, $P_2O_5$, F, S, Se, Te or the like). Such interference would entrain the easily volatile components, which would lead to a modification of the glass composition. A premature blockage of filter devices is also avoided in this way.

* sic; above?—Trans. note.

Another advantage of the skull channel according to the invention lies in the fact that when additional heating is produced by means of burners, with or without ceramic cover, a reducing atmosphere can be established. This is necessary for the production of thermal insulation glasses or glasses with high UV transmissivity, in which it happens that the $Fe^{3+}/Fe^{2+}$ ratio is shifted as extensively as possible to the reduced form. $Fe^{2+}$, which absorbs in the IR, and thus is used for heat radiation (thermal insulation glass), whereas $Fe^{3+}$, which absorbs in the UV, must be avoided as extensively as possible in the case of glasses with high UV transmissivity. Since these glasses are often phosphate or fluorophosphate glasses, the use of a ceramic cover plate is important. A similar argument applies to the production of initial glasses, in which it happens that the chalcogenides necessary for coloring are present at least partially in reduced form ($S^{2-}$, $Se^{2-}$, $Te^{2-}$). Here, it is also of advantage to minimize evaporation, in this case of color components, by the use of ceramic cover plates.

Reducing conditions may also be established with the use of electrical heating from above by means of corresponding reducing gases or gas mixtures (forming gas, $H_2$, $CO/CO_2$ and others), but the use of an adjusted burner to produce a reducing atmosphere (incomplete gas combustion, i.e., a smaller quantity of air/oxygen) is generally more cost-favorable.

The described channel systems may be joined by flanges to conventionally heated platinum or stone channels. When connected to a stone channel, the cooling of the stone channel-skull transition region is important. In operation, usually a good contacting of the water-cooled channel with the stone material is sufficient. During the heat-up phase, the freedom of motion of the stone channel must be assured relative to the HF channel, since the stone channel extends during tempering, whereas the water-cooled HF channel retains its geometry. The procedure of moving the stone channel up to the HF channel only after tempering and attaching it in the hot state has proven optimal.

When an HF channel is contacted with an electrically heated platinum channel, it must be assured that either there is no electrical contact between the metal components of the HF channel or, however, there is a very good electrical contact. The latter case conceals the danger that HF interference signals might be decoupled by means of the platinum system, but is preferred to the poor contact, which is accompanied by spark formation at places with increased resistance.

A complete electrical separation between skull channel and platinum channel can be achieved by ceramic intermediate pieces, which must assure a distance of at least 5 mm between metal components. Greater distances offer more security relative to electric breakdown strength, but are more difficult to seal, particularly in the case of aggressive melts. A quartz ceramic has proven most suitable as insulation material.

If the channel has a length of more than 1200 mm, then it must be heated with several flat coils, whereby the flat coils are ideally provided with energy by different HF generators, in order to be able to adjust the temperature in the individual channel regions, independently of one another. The distance x between adjacent flat coils should be greater than or at least equal to the height of the coil winding d, and thus the HF fields cannot mutually influence one another.

An unheated or only very weakly heated region lies in the transition region between two flat coils, since the two flat coils cannot be randomly guided next to one another. The melt cools down in this zone. An up-and-down heating of a glass melt is undesired for glass quality, and particularly also due to the danger of thermal reboil. In order to assure a flat temperature profile or a monotonically rising or monotonically falling temperature profile over the entire channel length, an additional heating device must be installed in the transition region between two coils. In the channel type described here, either an additional electrical heating device (e.g., sic rods or kanthal needles) or a gas firing can be utilized. In the case of gas firing, the use of flat coils and guiding the coil just below the channel has proven advantageous.

DESCRIPTION OF THE DRAWINGS

The invention will be explained in more detail on the basis of the drawing. Here, the following is represented individually.

DETAILED DESCRIPTION OF THE INVENTION

Figure 1:
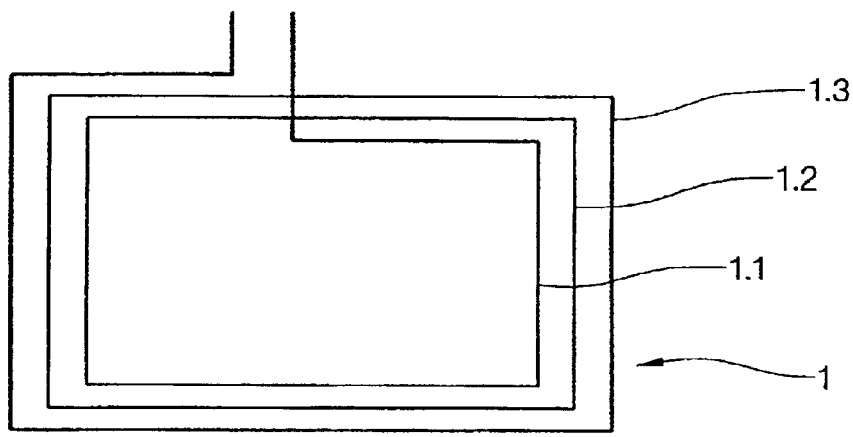
FIG. 1 is a top view onto an induction coil for a device according to the invention.

Coil 1 shown in FIG. 1 has endless-screw-shaped [helical] running windings 1.1, 1.2, 1.3. In the present case, the windings lie in a horizontal plane, precisely in the direction of glass flow 2 (see FIG. 2). The inside diameter of the inner winding in the direction of glass flow 2 is relatively large. It can amount to a multiple of the inside diameter perpendicular to the direction of glass flow 2.

Figure 2:
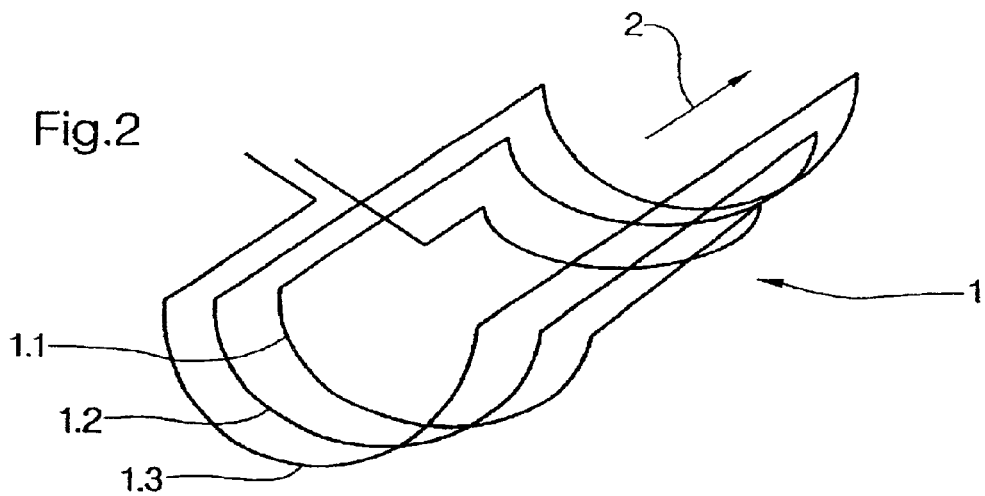
FIG. 2 is a 3-D view of an induction coil, which is slightly curved in one plane.

The coil 1 shown in FIG. 2 is also shaped like an endless screw and has windings 1.1, 1.2, 1.3. It is understood that a much larger number of windings is also possible. This coil is slightly curved in a plane. The winding segments running in the direction of glass flow 2 lie on both sides of the channel, which is not shown here.

Figure 3:
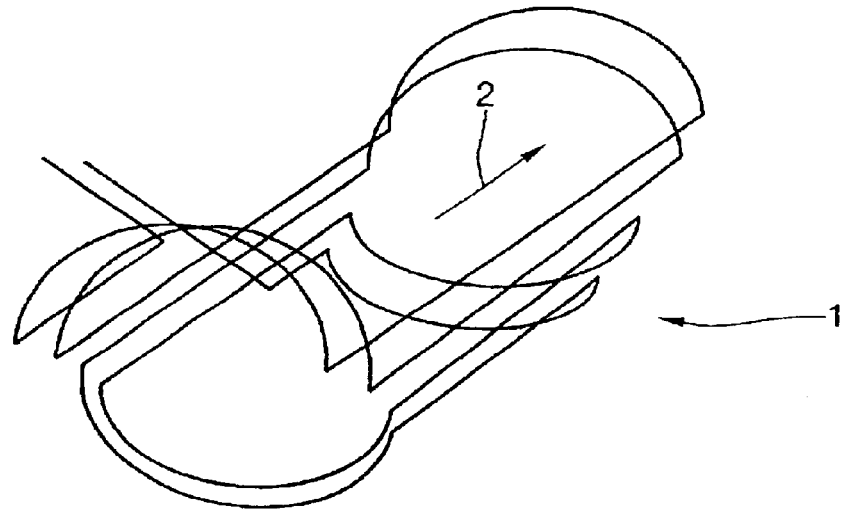
FIG. 3 is a 3-D view of two coils, which are each slightly curved in one plane.

The windings are subdivided in the coil shown in FIG. 3. Winding segments are again recognized, which run in a straight line parallel to the direction of glass flow. The curved winding segments lie at the beginning and the end of the channel. One-half of the windings run below and one-half of the windings run above the channel, which is not shown. In this way, the following is achieved: those high-frequency stresses, which are induced in skull pipes and which are produced by curved coil segments, are extensively neutralized by the countercurrent circuit of the curved winding segments.

Figure 4:
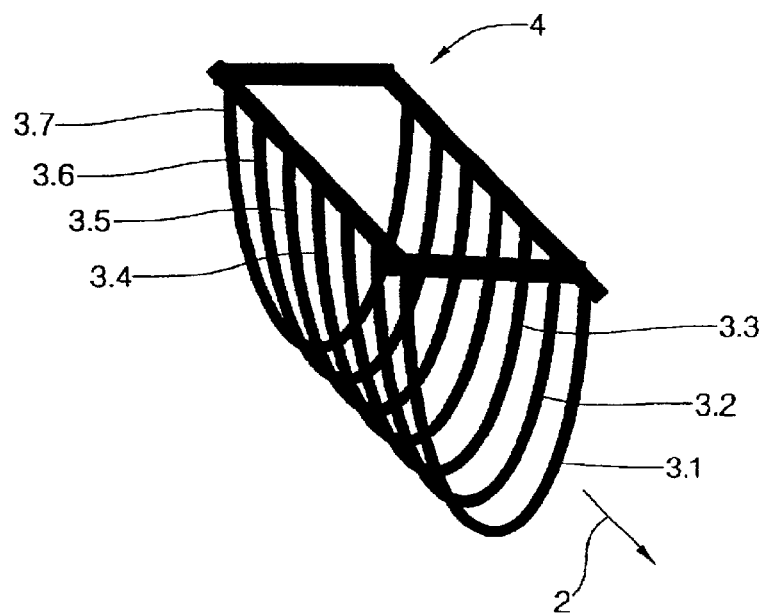
FIG. 4 shows a cage-type skull channel.

FIG. 4 shows the skull channel 3. It has a multiple number of U-shaped skull pipes 3.1–3.7. The skull pipes lie in planes parallel to one another. Instead of a pure U-shape, deviations from this are also conceivable, for example, an approximate V shape. The skull pipes are, as in the case of skull pots, water-cooled metal pipes.

Conductors 4 are provided at the free ends of the U-shaped elements, and these shunt the free ends of the U elements. These shunt lines 4 are also cooled by air or water.

In the present case, the U-shaped elements run in planes, which lie perpendicular to the direction of glass flow 2. However, it would also be conceivable to arrange the U-shaped elements in planes inclined to this direction.

FIG. 4 makes it clear that the space enclosed by shunt conductors 4 is open toward the top. The melt is thus accessible from the top, except for the shunt zones at the channel inlet and at the channel outlet. Thus, there are no water-cooled components above the melt and there is also no danger of condensation of evaporation products with the disadvantages described above. Also, gas burners or other additional heating devices can be arranged above the melt. Heat from above is advantageous for the case when the channel is utilized as a refining aggregate. This additional heating may be necessary in order to bring the surface region of the melt to particularly high temperatures, and thus the bursting of bubbles and the discharge of gas from the melt is assured.

Figure 5:
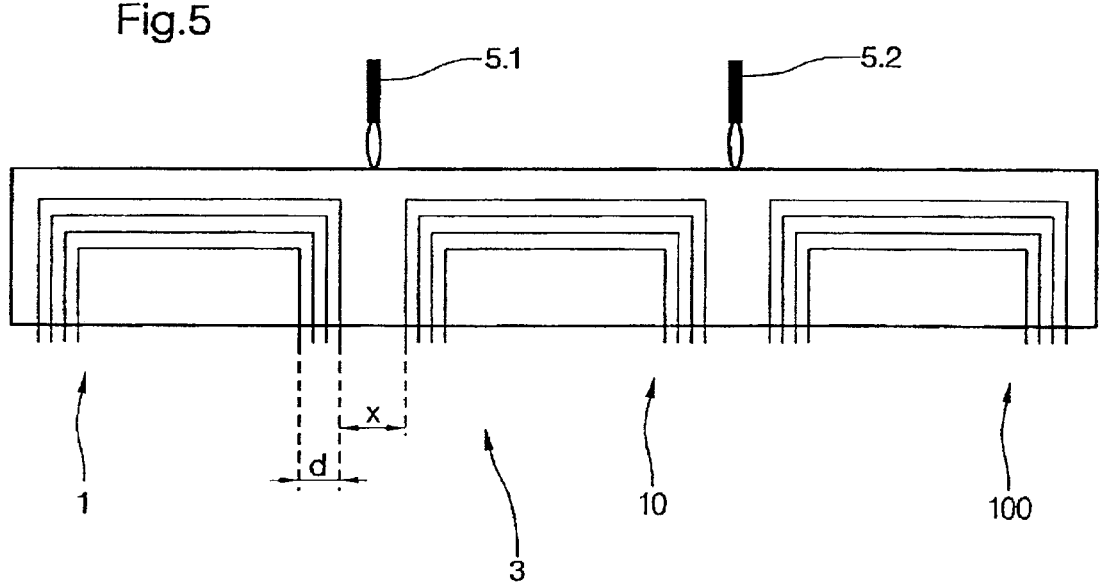
FIG. 5 schematically illustrates a skull channel with several flat coils connected in series.

FIG. 5 shows a relatively long skull channel 3. Several flat coils 1, 10, 100, are assigned to this channel 3. Also, additional heating devices 5.1, 5.2 are provided. The additional heating devices each time lie in the transition region between two flat coils.

Figure 6:
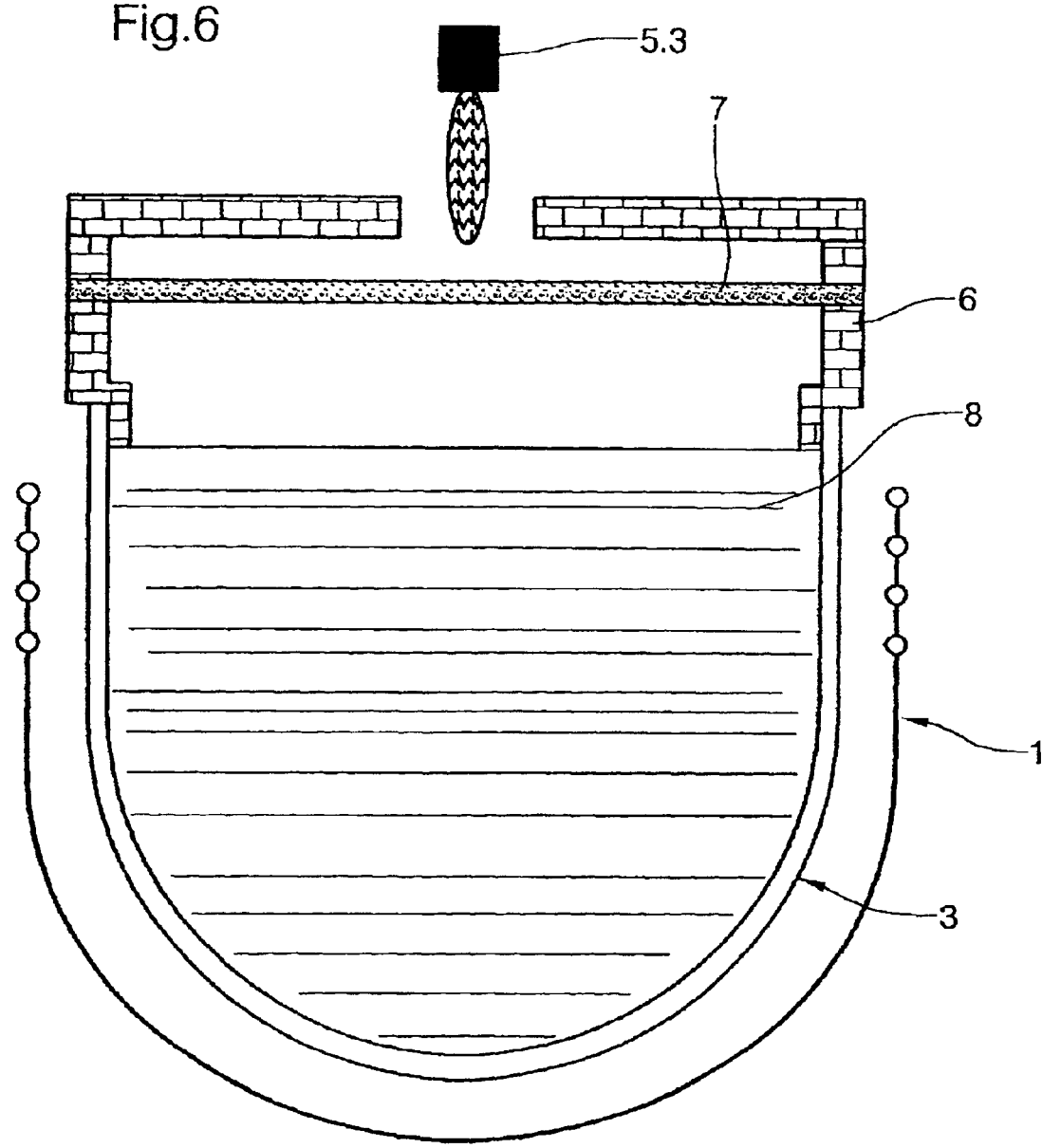
FIG. 6 shows a skull channel in a section perpendicular to the direction of glass flow with induction coil and burner belonging to it.

FIG. 6 shows a device according to the invention in a section perpendicular to the direction of glass flow. As is shown in FIG. 4, melt 8 flows through skull channel 3. Thus the melt flow moves extraordinarily slowly. The skull channel is surrounded by an induction coil 1. This may have the configuration of the coils shown in FIGS. 1–3.

The upper furnace space is formed of a structure 6 of refractory material. An additional burner heating unit 5.3 is provided therein. The latter can transfer heat directly onto the melt surface. However, the transfer may also be made indirectly. As shown here, a ceramic plate 7 can be provided, which is heated by the burner additional heating unit and then heat is introduced, distributed uniformly on the melt surface.

Figure 7:
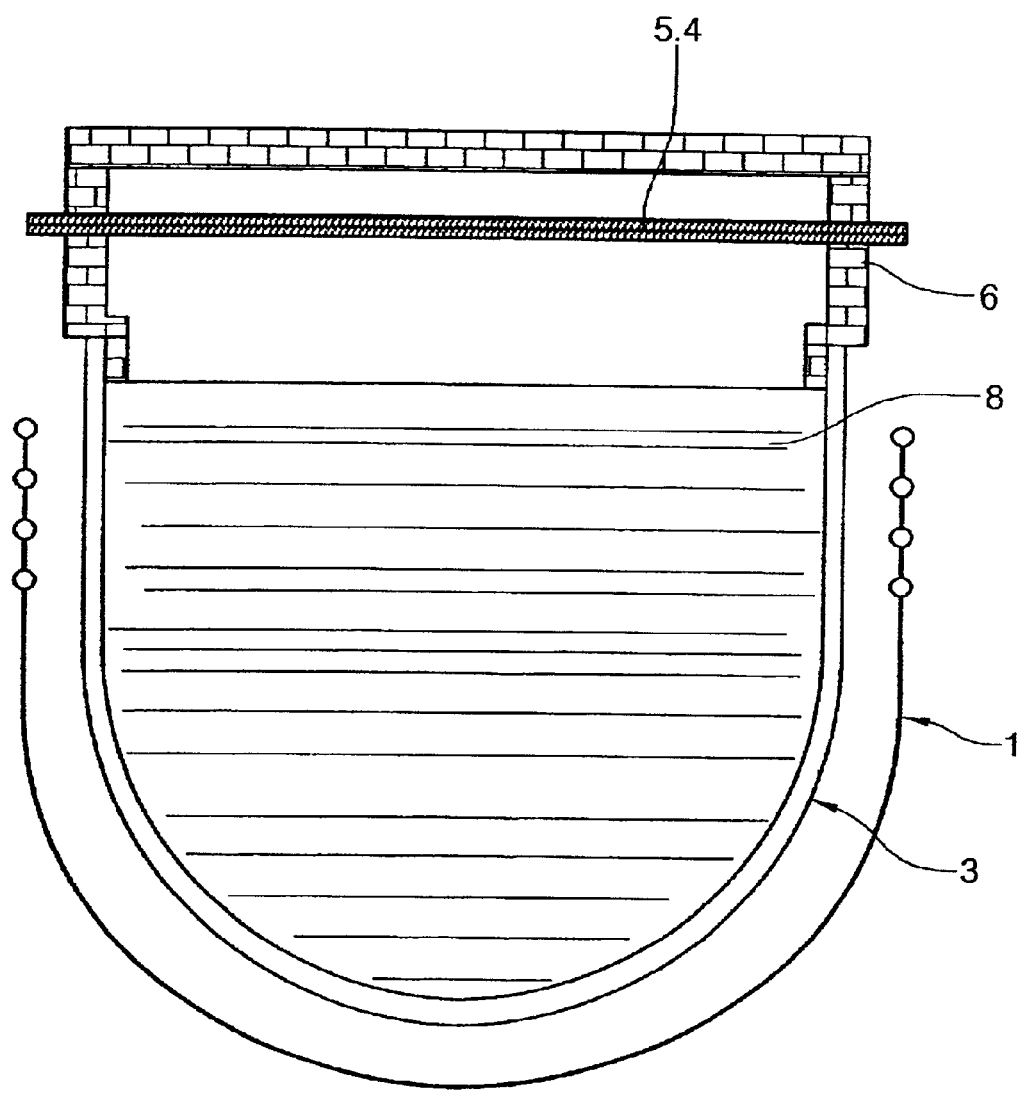
FIG. 7 shows a similar subject to that of FIG. 6, but with an additional electrical heating device.

In the form of the embodiment according to FIG. 7, instead of a ceramic plate 7, an additional electrical heating unit 5.4 is provided, which heats the melt surface.

The coil has a central opening that is as large as possible. The coil runs to the right and left of the channel parallel to the glass flow and at the end of the channel, below the channel, onto the opposite-lying side of the channel. Ideally, one-half of the windings run below the channel and the other half of the windings run above the channel on the opposite-lying side. It is achieved in this way that the HF voltages induced by these coil pieces in the skull U-shaped pipes are extensively neutralized by the countercurrent circuit. In the region of the coil feedback on the opposite-lying channel side, the skull channel is shunted at the upper end from one side of the channel to the other. The shunt is cooled by air or water.

The skull channel preferably comprises a number of U-shaped segments, which have a circuit shunt at the upper end. In projection from the top, the coil is a helical, wound, rectangularly crushed flat coil, whose narrow sides are guided around above and/or below the channel. If the coil pieces are guided along above the channel, then ceramic insulation, e.g., in the form of a quartz bridge can be introduced between the melt and the coil.

The construction has the advantage, when compared with cylinder-shaped channels with cylindrical coils, that no water-cooled components are present in the upper region of the melt, with the exception of the shunt zones at the inlet and outlet of the channel, so that the melt is hotter here and there is no danger of condensation of evaporation products. Also, the region above the melt is freely accessible for the installation of a gas or electric upper heating unit. This upper heating unit is advantageous for the case when the channel is used as a refining aggregate, since higher surface temperatures can be obtained therewith, and thus the bursting of bubbles can be assured. Upper heating is also helpful in the case of the failure of high-frequency energy, since in this case at least the glass transport can be assured and recoupling of high-frequency heating is facilitated after the failure.

In addition, the described structure is advantageous for introducing a complex superstructure, comprised of ceramic plates, which cover the channel, in which the gas flows. These ceramic plates are heated by burners on the upper side and in turn radiate the glass surface by their underside, so that the glass is indirectly heated. This has the advantage that in glasses containing components tending strongly toward evaporation, such as, for example, $B_2O_3$, $P_2O_5$, F, S, Se, Te and others, there is no occurrence of strong and turbulent atmospheric flows directly above the glass melt, which entrain the easily volatile components and thus lead to a modification of the glass composition. Also, a premature blockage of filter devices caused by this is avoided.

Another advantage of the selected structure is that a reducing atmosphere can be established with an additional heating by means of burners, either with or without ceramic cover plates. This is necessary for the production of thermal insulation glasses or glasses with high UV transmissivity, in which it happens that the $Fe^{2+}/Fe^{2+}$ ratio is shifted as extensively as possible to the reduced form. $Fe^{2+}$, which absorbs in the IR, thus is used for heat radiation (thermal insulation glass), whereas $Fe^{3+}$, which absorbs in the UV, thus must be avoided as extensively as possible in the case of glasses with high UV transmissivity. Since the glasses are often phosphate or fluorophosphate glasses, the use of a ceramic cover plate can be important. A similar argument applies to the production of initial glasses, in which it happens that the chalcogenides necessary for coloring are present at least partially in reduced form ($S^{2-}$, $Se^{2-}$, $Te^{2-}$). Here, it is also of advantage to minimize evaporation, in this case of color components, by the use of ceramic cover plates.

The present invention having been thus described with particular reference to the preferred forms thereof, it will be obvious that various changes and modifications may be made therein without departing from the spirit and scope of the present invention as defined in the appended claims.

What is claimed is:

1. A device for melting or refining of glasses or glass ceramics comprising:

a plurality of pipes forming a U-shape and lying next to one another so that said plurality of pipes form a cage-type skull channel having an open top, said plurality of pipes being able to be connected to a cooling medium, said cage-type skull channel for channeling a melt of the glasses or glass ceramics in a substantially horizontal flow direction; and a high-frequency oscillation circuit having an induction coil, said induction coil being disposed about a portion of said cage-type skull channel such that said open top is free of said induction coil.

2. The device according to claim 1, wherein said U shape has ends, and wherein the ends of the U-shape are joined together in a conducting manner for purposes of forming a short-circuit bridge.

3. The device according to claim 1, wherein said cage-type skull channel is thermally insulated in an upper space of a furnace.

4. The device according to claim 1, further comprising an additional heating unit in an upper furnace space.

5. The device according to claim 4, wherein the additional heating unit is configured and arranged to act directly on a surface of said melt.

6. The device according to claim 4, further comprising a ceramic plate that is heated by said additional heating unit and gives off heat to a surface of said melt between said additional heating device and the surface of said melt.

7. The device according to claim 1, further comprising a plurality of flat coils connected one behind the other and assigned to said cage-type skull channel.

8. The device according to claim 7, further comprising an additional heating unit provided in a transition region defined between said plurality of flat coils and a second plurality of flat coils.

* * * * *